July 23, 1929.  S. HAMMER  1,721,593
KNOCK-OUT FOR ELECTRIC JUNCTION BOXES, SWITCH BOXES, ETC
Filed Dec. 16, 1926
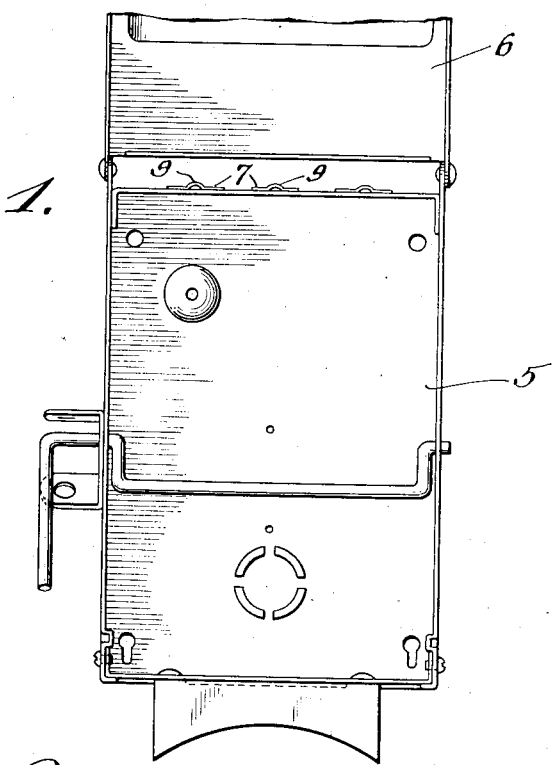
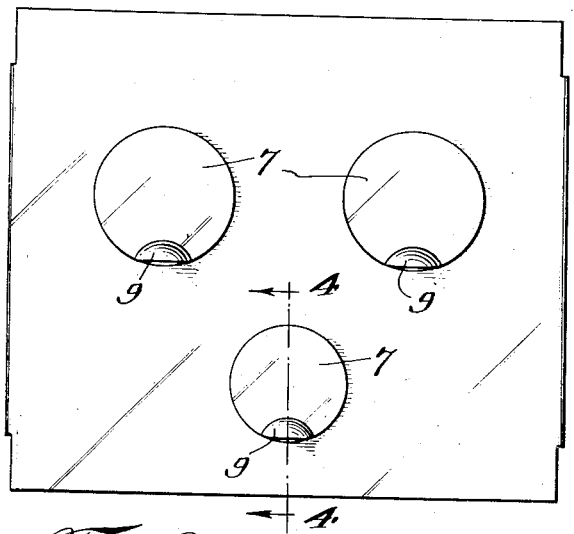
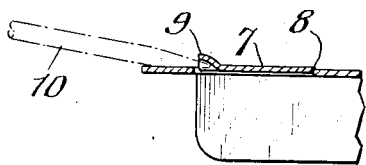
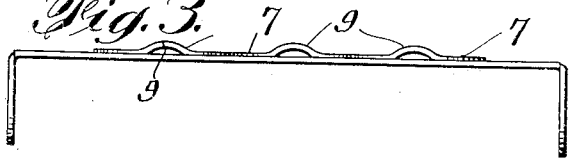
INVENTOR
Samuel Hammer
BY
ATTORNEY Patented July 23, 1929.

1,721,593

UNITED STATES PATENT OFFICE.

SAMUEL HAMMER, OF BROOKLYN, NEW YORK, ASSIGNOR TO UNITED METAL BOX CO., INC., OF BROOKLYN, NEW YORK, A CORPORATION OF NEW YORK.

KNOCK-OUT FOR ELECTRIC JUNCTION BOXES, SWITCH BOXES, ETC.

Application filed December 16, 1926. Serial No. 155,163. REISSUED

This invention relates to knock-outs for electric junction boxes, switch boxes, etc., and has for its primary object to provide one or more walls of the box structure with integrally connected sections or discs which may be readily detached or separated from the box wall to provide openings therethrough for the lead-in wires without necessitating the use of a hammer.

It is a more particular object of the invention to provide each of the knock-out discs or sections with an outwardly projecting part or lip with which the point of a screwdriver may be readily engaged and the necessary leverage applied to separate said disc at its perimeter from the box wall, thus the box structure is not subjected to a severe shock or vibration which might possibly result in injury or derangement of the parts of the mechanism associated therewith, which is not an infrequent occurrence when such junction boxes are used in connection with electrically controlled clocks or other comparatively delicate mechanisms.

It is a further general object of my present improvements to provide a knock-out for electrical junction or switch boxes as above characterized which involves no additional operations in the present method of manufacturing such boxes and therefore, entails no additional manufacturing cost.

With the above and other objects in view, the invention consists in the improved knockout for junction or switch boxes and in the form and construction of the several features thereof as will be hereinafter more fully described, illustrated in the accompanying drawings and subsequently incorporated in the subjoined claims.

In the drawing, wherein I have disclosed one simple and practical embodiment of my present improvements and in which similar reference characters designate corresponding parts throughout the several views,—

Figure 1 is a front elevation of an electric switch box provided with my present improvement and showing the cover in open position;

Fig. 2 is an enlarged elevation of one of the box walls provided with my improved knock-outs;

Fig. 3 is an edge view thereof, and

Fig. 4 is a detail sectional view taken on the line 4—4 of Fig. 2.

Referring in detail to the drawing, 5 generally designates the body of the junction or switch box, the several walls of which are in the form of sheet metal stampings. To the side walls of the box body 5 at one end thereof, the cover or closure for the open side of the box indicated at 6 is hingedly connected. Further detailed description of the box construction, is unnecessary, as the invention constituting the subject matter of this application may be advantageously employed upon various types and constructions of such boxes now generally used in this art.

As herein shown, in the formation or stamping of the end or side walls of the box, at properly located points circular disc-like sections 7 are subjected to pressure by parts of the stamping die and partially projected from the general plane of the box wall as clearly shown in Fig. 4 of the drawing. However, these discs at their perimeters remain integrally connected with the wall structure by a comparatively thin fin of metal as indicated at 8. This weakened connection between the discs and the box wall will permit of the complete separation of the discs from said wall by the application of leverage to the edge of the disc. In order that such leverage may be readily applied, a minor part of the disc at its edge is completely separated from the box wall and angularly projected outwardly beyond the plane of said disc to form a lip 9.

In the use of such electrical junction boxes in connection with electrical clocks or other mechanisms, the box is suitably mounted within the clock case, and in the installation of the clock, the discs 7 are removed from that wall of the box so as to provide the openings therethrough most conveniently located with respect to the arrangement of the wiring in the building so that the lead-in wires may be passed through said openings. Heretofore, these knock-out discs have been integrally connected throughout their circumferential edges with the box wall and it has been necessary to remove said discs by striking the same several severe blows with a hammer. It has been found that in many cases, this results through the jar or vibration, in derangement of the parts of the delicate clock mechanism, and as the space in which the hammer may be wielded is comparatively restricted, there is also great liability of the hammer striking parts of the mechanism and seriously damaging the same so that they have to be replaced. It will be apparent that by means of my present improvements, it is not necessary to subject the box structure or the casing within which it is mounted to such severe vibrations, as the discs 7 can be readily removed by merely inserting the point of a screwdriver or other implement as indicated at 10 beneath the lip 9 and prying outwardly while the point of the screw-driver is in bearing contact against the face of the box wall. Thus, the relatively thin fin 8 at the perimeter of the disc may be ruptured, and the disc completely separated from the box wall to provide the necessary opening therein. It will be apparent that this operation may be very quickly performed without the slightest jar or vibration of the box structure so that there is no possibility of injury to parts contained therein or to the mechanism which may be associated therewith.

From the foregoing description considered in connection with the accompanying drawing, the construction and manner of use of my improved knock-out construction for electric switch or junction boxes will be clearly understood. The device may of course, be also advantageously employed in connection with various other forms of electrical apparatus housed within a box or casing. Likewise, the particular shape and size of the disc 7 or the form and arrangement of the lip 9 or other means with which the tool is adapted to be engaged is not material and may be variously modified as may be found desirable to satisfactorily meet different conditions. Therefore, while I have herein shown and described one simple and practical embodiment of the device which has given excellent results in actual use, it is nevertheless to be understood that the invention is susceptible of embodiment in various other alternative forms, and I accordingly reserve the privilege of resorting to all such legitimate changes in the essential features thereof as may be fairly embodied within the spirit and scope of the invention as claimed.

I claim:

A metal container for electrical apparatus having a wall with a removable portion marked out thereon, said portion being integral with said wall and connected therewith around the greater part of its periphery by a metal fin which is thin enough to permit the ready separation of said portion of said wall, said fin being too thin to permit bending without breaking, the remaining portion of the periphery being bent to form a lateral projection to permit an implement to be inserted under said projection to break out said portion.

In testimony that I claim the foregoing as my invention, I have signed my name hereto.

SAMUEL HAMMER.